UNITED STATES PATENT OFFICE.

ALEXANDER C. THOMPSON, OF ST. LOUIS, MISSOURI.

INSULATING COMPOUND.

SPECIFICATION forming part of Letters Patent No. 537,321, dated April 9, 1895.

Application filed July 30, 1894. Serial No. 519,018. (No specimens.)

*To all whom it may concern:*

Be it known that I, ALEXANDER C. THOMPSON, of the city of St. Louis, State of Missouri, have invented certain new and useful Improvements in Insulating Compounds, of which the following is a full, clear, and exact description.

My composition consists of the following ingredients combined in the approximate proportions stated, viz: alcohol, one gallon; gum shellac, five pounds; pulverized asbestos, six pounds; pulverized French chalk, four pounds; balsam tolu gum, one pound; ground mica, four pounds. This will form a composition of about thirty pounds weight.

The different ingredients are mixed and commingled in the following manner: The gum shellac is cut or dissolved with alcohol, and the balsam tolu gum is also cut or dissolved with alcohol. These two separately cut and dissolved ingredients are now thoroughly mixed together which form the liquid portion of the mixture. The pulverized asbestos and pulverized French chalk are now thoroughly mixed and commingled, after which the ground mica is mixed and commingled with the pulverized asbestos and pulverized French chalk. This powder so formed is now thoroughly mixed and commingled with the liquid until the preparation assumes the consistency of ordinary paint, molasses, &c. If desired, a small proportion of powdered fire or china clay may be used with the before mentioned ingredients. The composition is now ready to be applied wherever needed with a paint brush, or in any suitable manner.

A composition so formed will adhere to any substance, and it is especially designed for insulating armatures, field coils, magnets, or wherever the winding of wire for electrical purposes is used.

The composition after being applied to different points or objects desired to be insulated is allowed to dry. It may, however, be artificially dried by heating, or in any suitable manner. Thus a thorough insulating material is formed, the same being easily and quickly mixed and applied.

What I claim is—

The herein described composition of matter to be used for insulating purposes, consisting of alcohol, gum shellac, pulverized asbestos, pulverized French chalk, balsam tolu gum, and ground mica in the proportions specified.

In testimony whereof I affix my signature in presence of two witnesses.

ALEXANDER C. THOMPSON.

Witnesses:
E. E. LONGAN,
JNO. C. HIGDON.